(12) United States Patent
Walther

(10) Patent No.: US 9,919,658 B1
(45) Date of Patent: Mar. 20, 2018

(54) COLLAPSIBLE CONTAINER ASSEMBLY

(71) Applicant: Thomas Melvin Walther, Kenosha, WI (US)

(72) Inventor: Thomas Melvin Walther, Kenosha, WI (US)

( * ) Notice: Subject to any disclaimer, the term of this patent is extended or adjusted under 35 U.S.C. 154(b) by 0 days.

(21) Appl. No.: 15/381,198

(22) Filed: Dec. 16, 2016

(51) Int. Cl.
*B60R 9/06* (2006.01)

(52) U.S. Cl.
CPC ........................... *B60R 9/06* (2013.01)

(58) Field of Classification Search
CPC ......... B60R 9/00; B60R 9/055; B60P 7/0876; A45C 13/002; A45C 13/008
See application file for complete search history.

(56) References Cited

U.S. PATENT DOCUMENTS

| | | | |
|---|---|---|---|
| 5,096,107 A * | 3/1992 | VanSon | B60R 9/055 224/309 |
| 5,868,295 A | 2/1999 | Carriere | |
| D410,224 S | 3/1999 | Landy | |
| 6,105,842 A | 8/2000 | Cesare | |
| 6,401,995 B1 * | 6/2002 | Yuille | B60R 7/02 220/483 |
| 6,543,659 B2 | 4/2003 | Blair | |
| 7,360,664 B1 | 4/2008 | Ransom | |
| D660,781 S | 5/2012 | Ruffino et al. | |
| 8,469,435 B2 | 6/2013 | Rufino et al. | |
| 8,562,214 B2 | 10/2013 | Dozier et al. | |
| 8,568,030 B2 * | 10/2013 | Martin | B60P 7/0876 224/400 |
| 2004/0094589 A1 * | 5/2004 | Fricano | B60R 9/00 224/404 |

* cited by examiner

*Primary Examiner* — Corey Skurdal

(57) ABSTRACT

A collapsible container assembly includes a box that may be positioned in a bed of a vehicle. The box stores objects. A plurality of tabs is provided and each of the tabs is coupled to the box. Each of the tabs is tied to the vehicle thereby facilitating the box to be retained in the bed of the vehicle. A frame is positioned within the box. The frame is foldable such that the frame is selectively positioned between a deployed position and a folded position. The frame retains the box in a cubic shape when the frame is in the deployed position. The box is collapsed when the frame is positioned in the folded position.

10 Claims, 8 Drawing Sheets

COLLAPSIBLE CONTAINER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to container devices and more particularly pertains to a new container device for being positioned in a bed of a pickup.

BRIEF SUMMARY OF THE INVENTION

An embodiment of the disclosure meets the needs presented above by generally comprising a box that may be positioned in a bed of a vehicle and the box stores objects. A plurality of tabs is provided and each of the tabs is coupled to the box. Each of the tabs is tied to the vehicle thereby facilitating the box to be retained in the bed of the vehicle. A frame is positioned within the box. The frame is foldable such that the frame is selectively positioned between a deployed position and a folded position. The frame retains the box in a cubic shape when the frame is in the deployed position. The box is collapsed when the frame is positioned in the folded position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
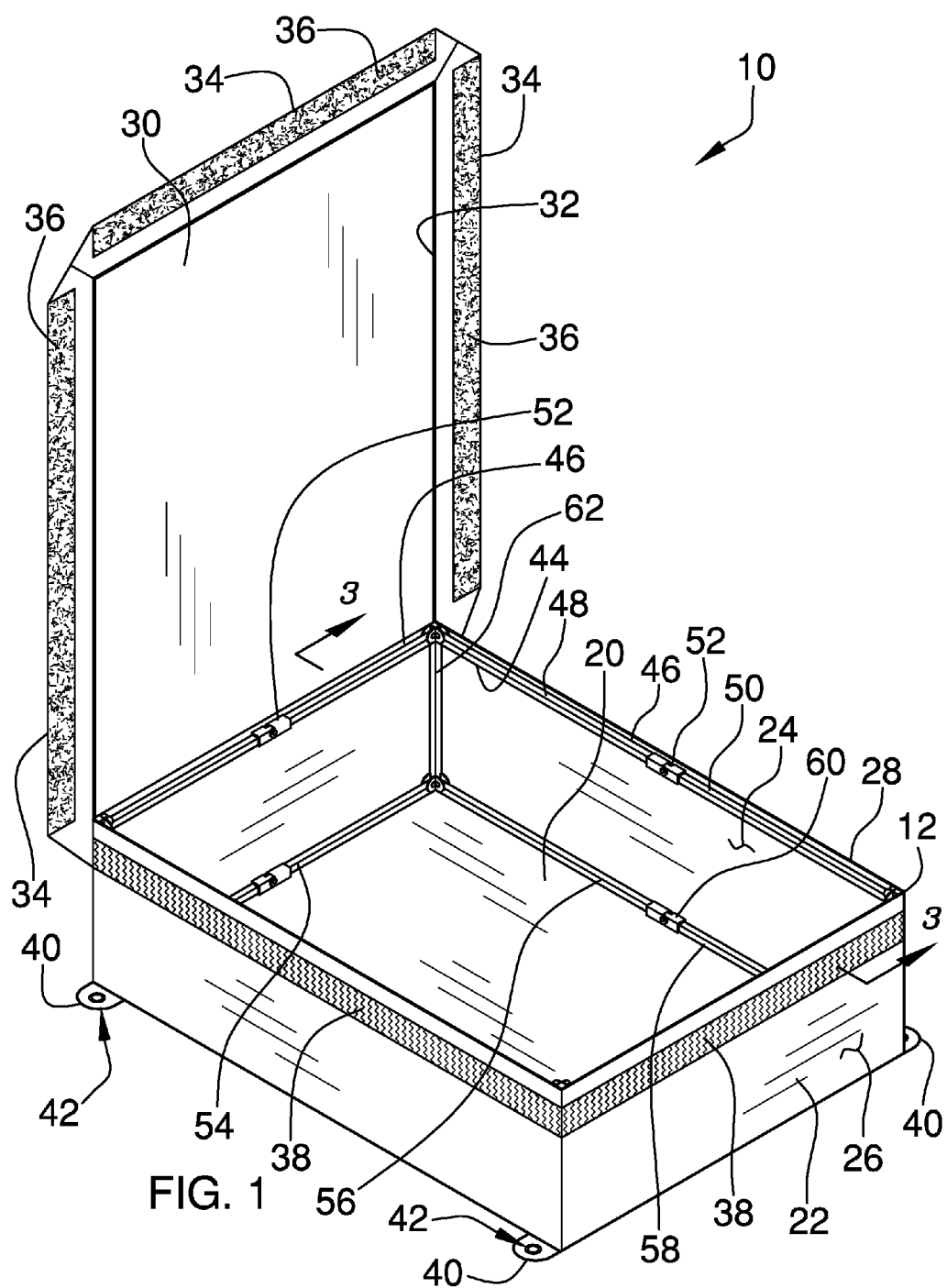
FIG. 1 is a front perspective view of a collapsible container assembly according to an embodiment of the disclosure.
Figure 2:
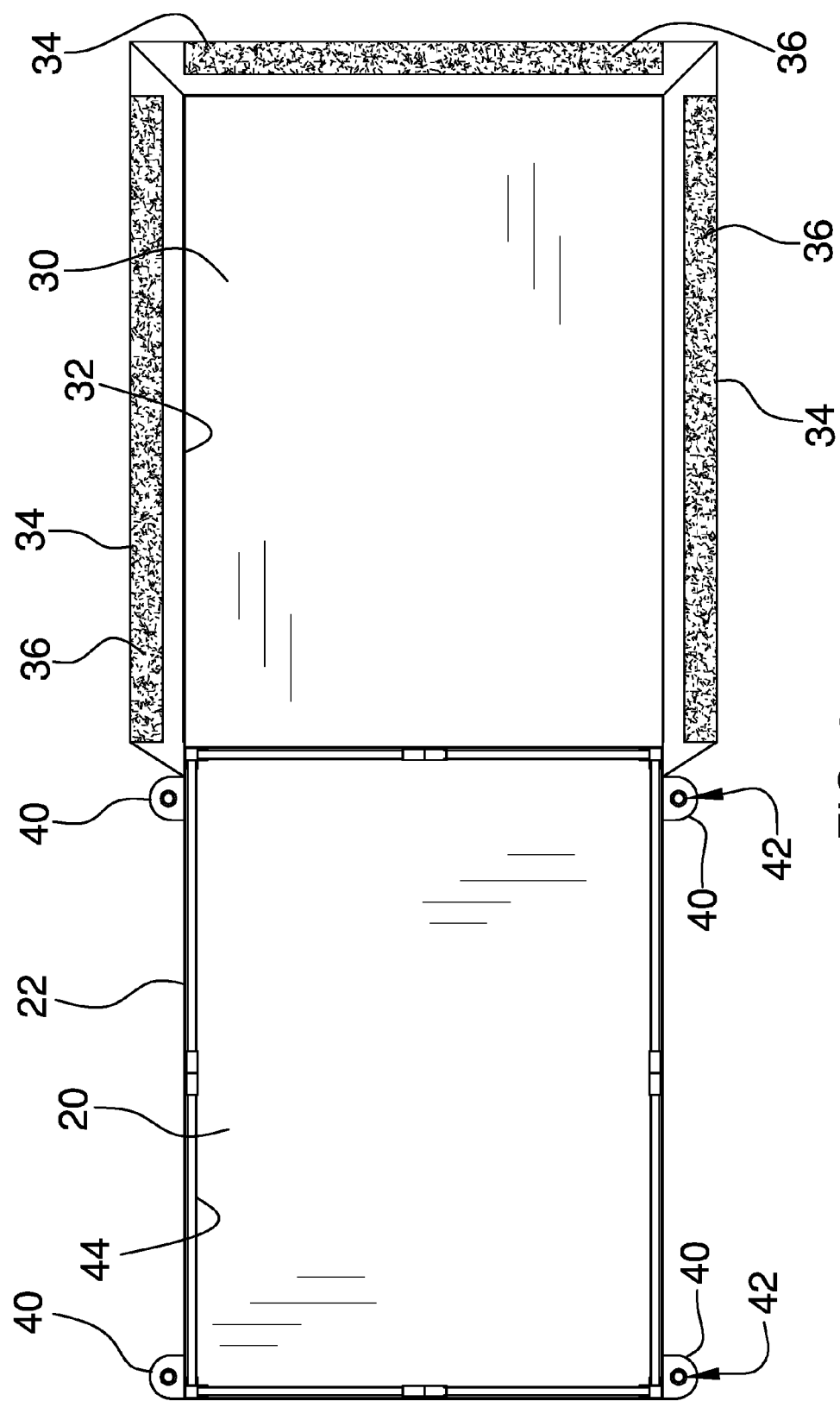
FIG. 2 is a top view of an embodiment of the disclosure.
Figure 3:
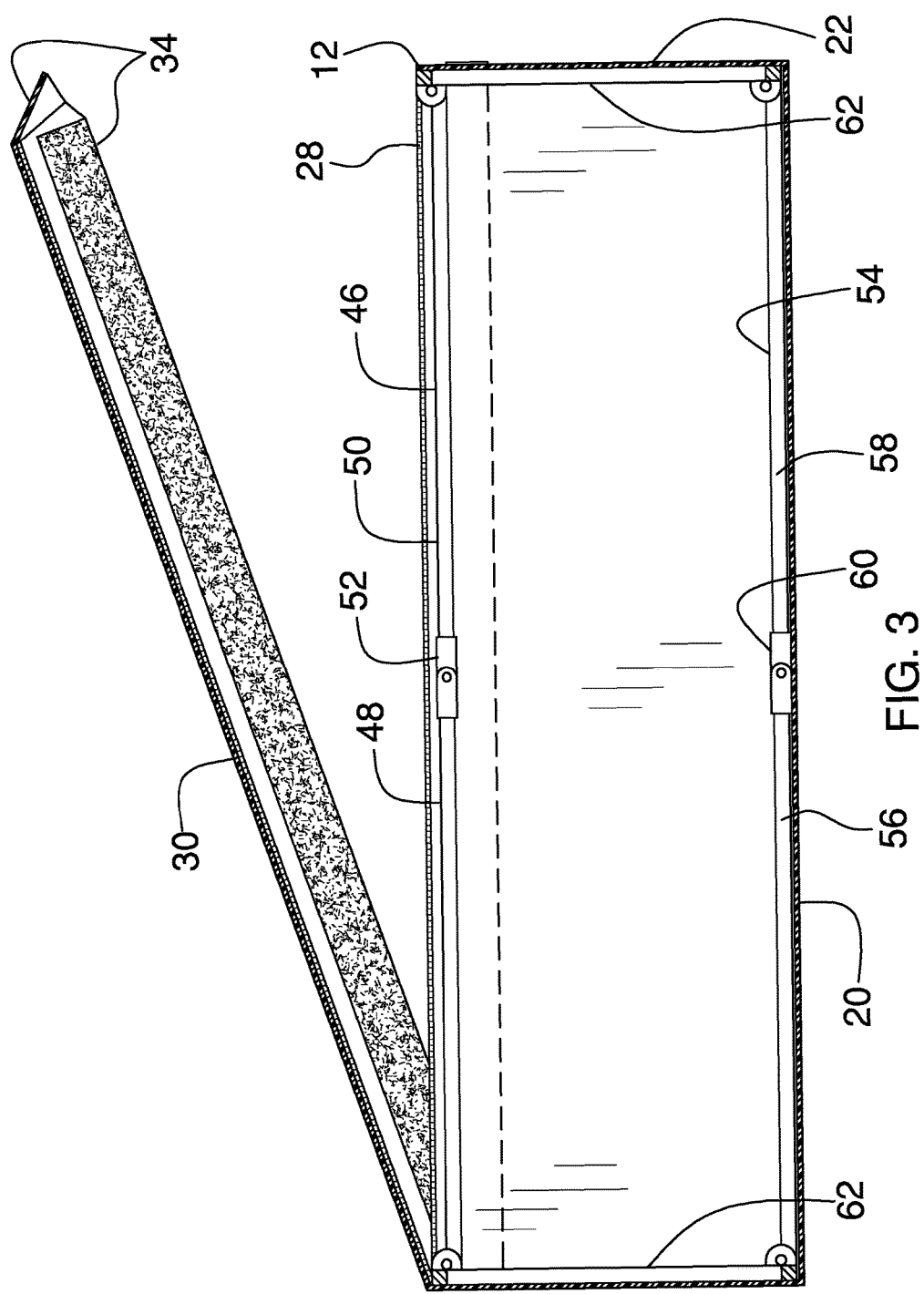
FIG. 3 is a cross sectional view taken along line 3-3 of FIG. 1 of an embodiment of the disclosure.
Figure 4:
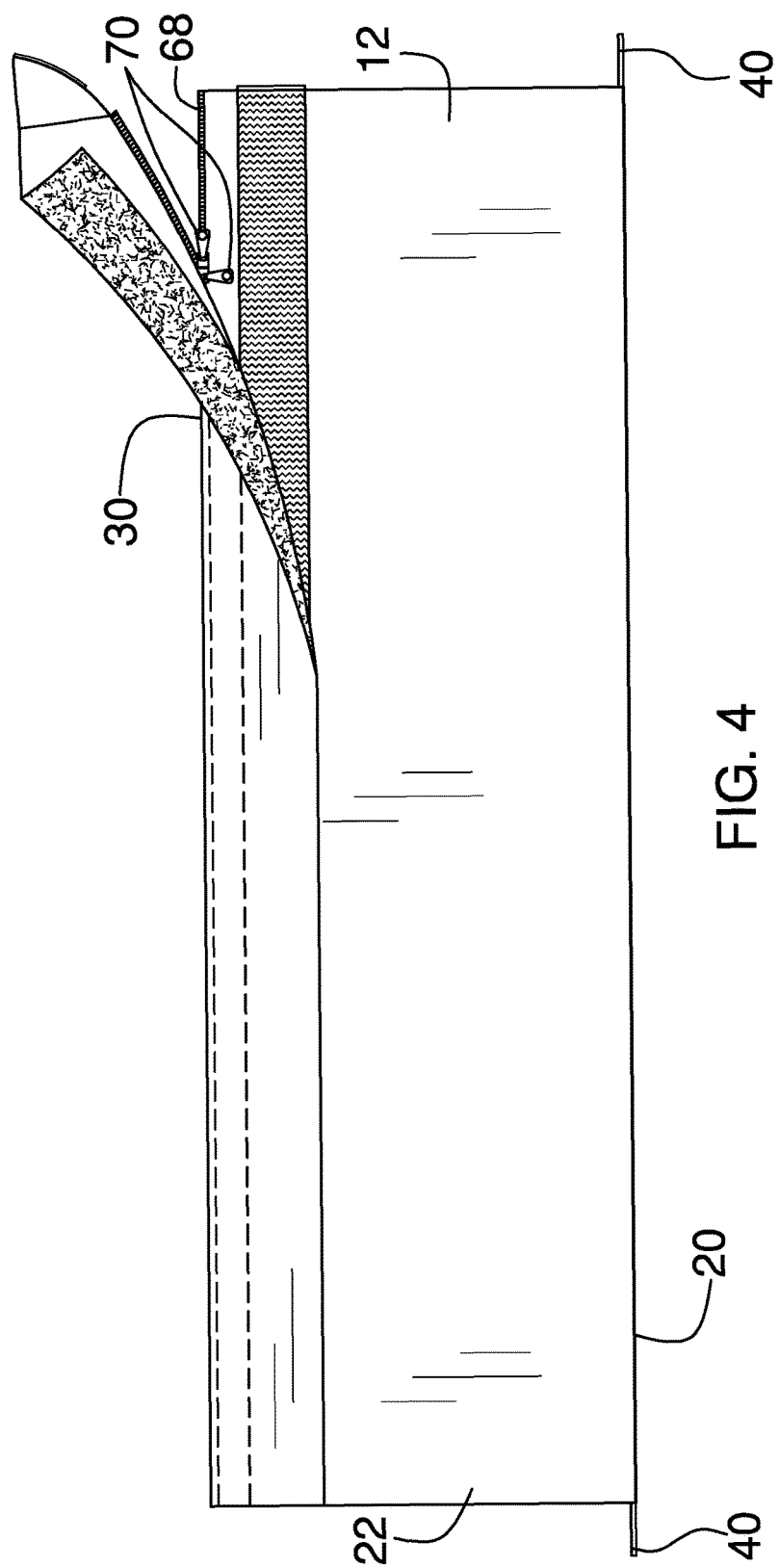
FIG. 4 is a front view of an embodiment of the disclosure.
Figure 5:
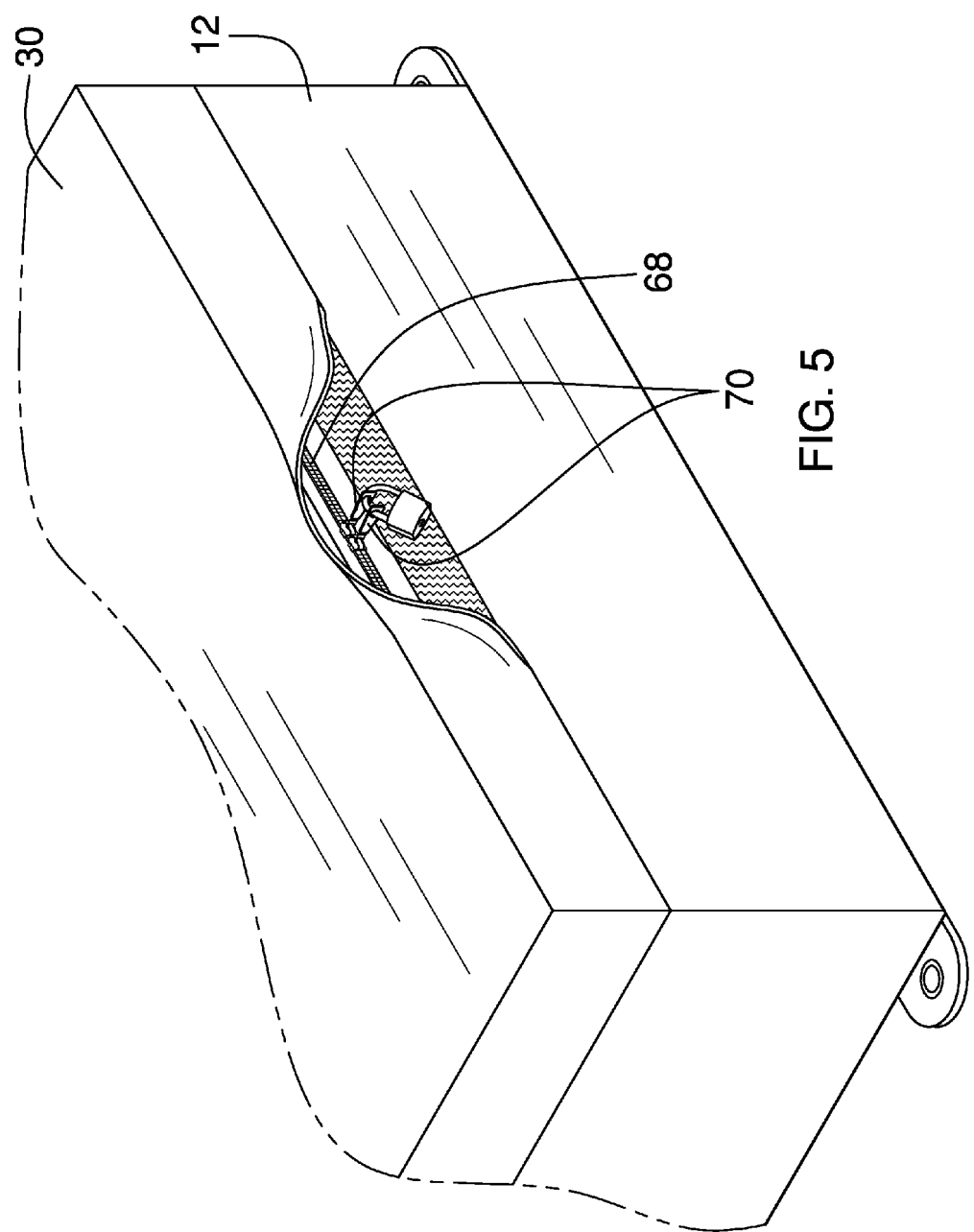
FIG. 5 is a perspective view of an embodiment of the disclosure.
Figure 6:
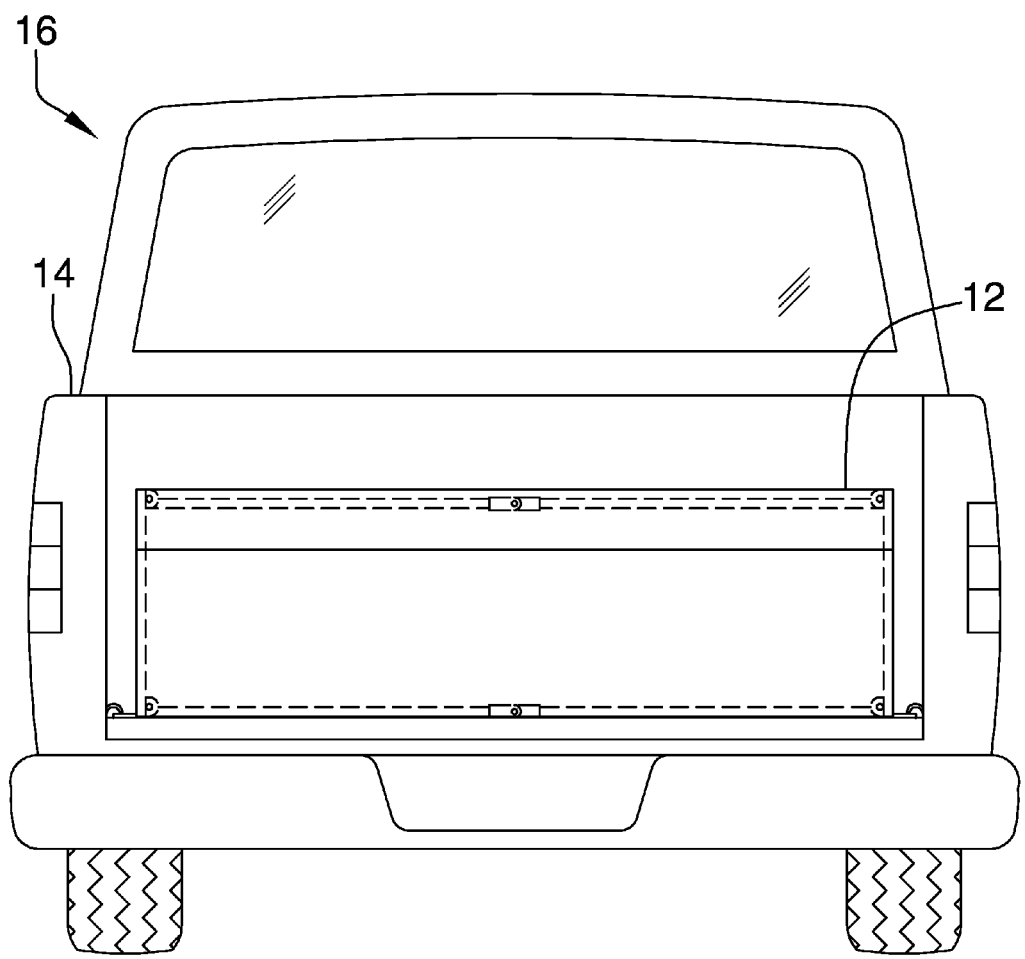
FIG. 6 is a perspective in-use view of an embodiment of the disclosure.

With reference now to the drawings, and in particular to FIGS. 1 through 8 thereof, a new container device embodying the principles and concepts of an embodiment of the disclosure and generally designated by the reference numeral 10 will be described.

As best illustrated in FIGS. 1 through 8, the collapsible container assembly 10 generally comprises a box 12 that may be positioned in a bed 14 of a vehicle 16 and the box 12 may store objects 18. The vehicle 16 may be a truck, a trailer or any other vehicle that has a bed or a platform. The box 12 is comprised of a fluid impermeable material to keep the objects 18 dry and the box 12 is comprised of a deformable material. The vehicle may be a pickup or the like.

Figure 7:
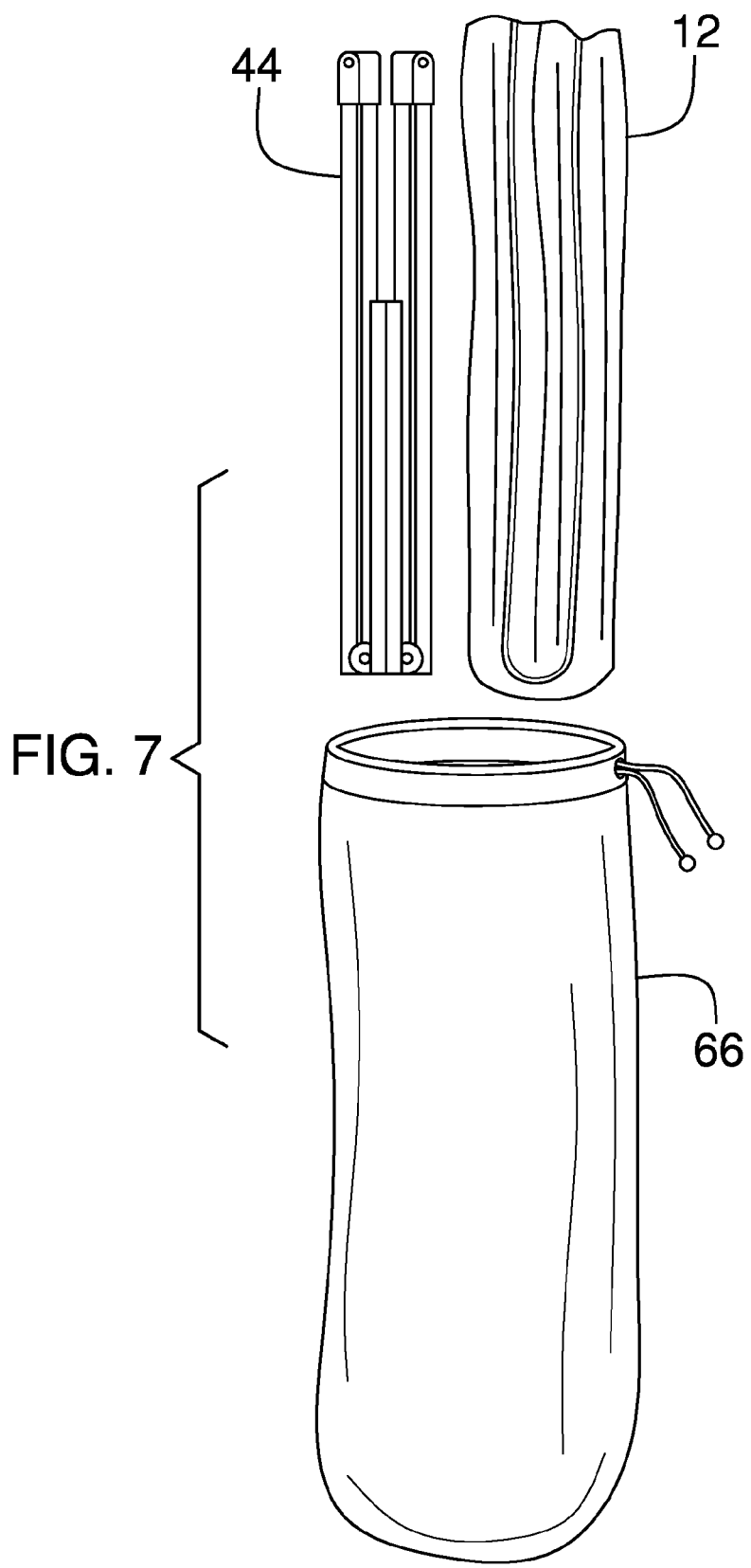
FIG. 7 is a kit view of an embodiment of the disclosure.
Figure 8:
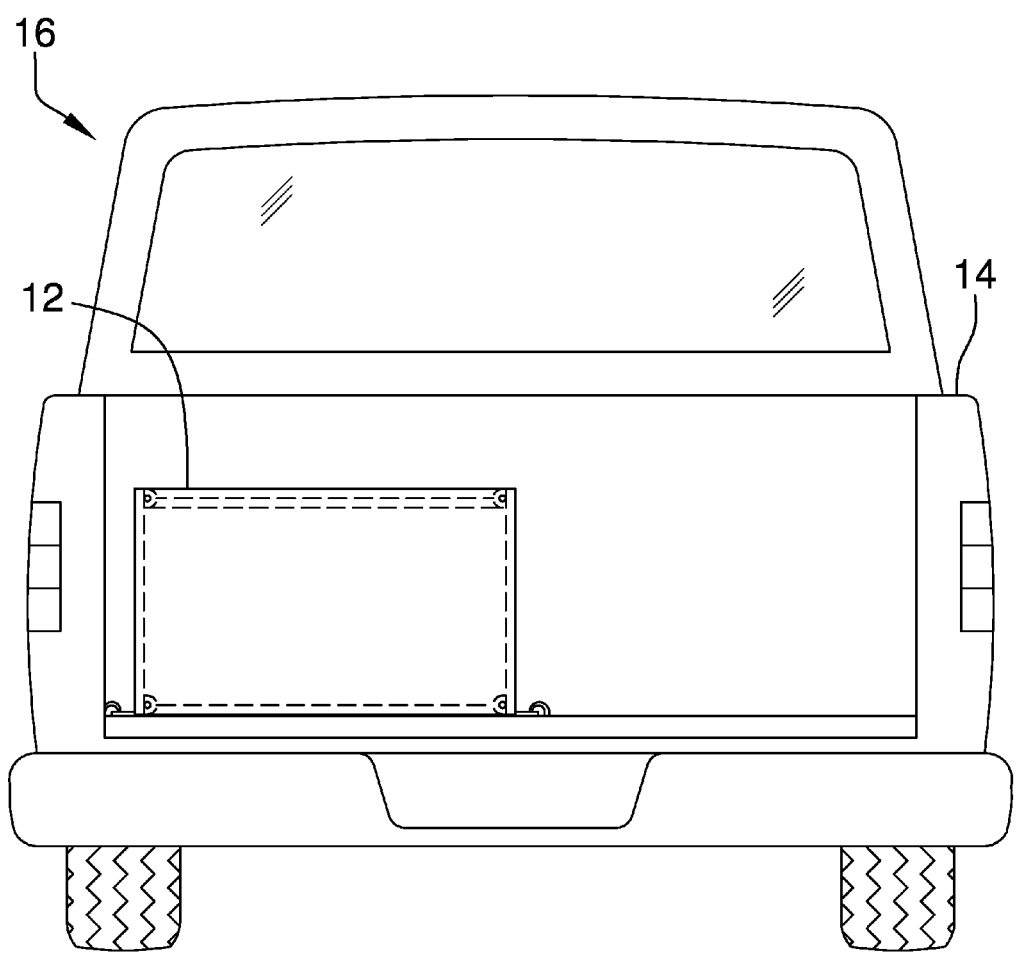
FIG. 8 is a perspective in-use view of an alternative embodiment of the disclosure.

The box 12 has a bottom wall 20 and a perimeter wall 22. The perimeter wall 22 has an inside surface 24, an outer surface 26 and a distal edge 28 with respect to the bottom wall 20. The box 12 includes a lid 30 that is selectively positioned on the distal edge 28 to close the box 12. The lid 30 has a perimeter edge 32. The lid 30 includes a plurality of flaps 34 and the flaps 34 are coextensive with the perimeter edge 32. The box 12 may have dimensions that are equal to interior dimensions of the bed 14 of the vehicle 16. As shown in an alternative embodiment 35 as shown in FIG. 7, the box 12 may have a width that is approximately equal to half the width of the bed 14.

A plurality of first fasteners 36 is provided and each of the first fasteners 36 is coupled to an associated one of the flaps 34. A plurality of second fasteners 38 is provided. Each of the second fasteners 38 is coupled to the outer surface 26 of the box 12. The second fasteners 38 are spaced apart from each other and are distributed around the perimeter wall 22. Each of the first fasteners 36 is complementary with respect to the second fasteners 38. Thus, the lid 30 is retained in a closed position. Each of the first and second fasteners 38 may comprise hook and loop fasteners or the like.

A plurality of tabs 40 is provided and each of the tabs 40 is coupled to the box 12. Each of the tabs 40 may be tied to the vehicle thereby facilitating the box 12 to be retained in the bed 14 of the vehicle. Each of the tabs 40 is spaced apart from each other and is aligned with an associated one of four corners 41 of the box 12. Each of the tabs 40 is aligned with the bottom wall 20. Each of the tabs 40 has an opening 42 extending therethrough and each of the tabs 40 may be reinforced around the opening 45.

A frame 44 is provided and the frame 44 is positioned within the box 12 and the frame 44 is foldable. Thus, the frame 44 is selectively positioned between a deployed position and a folded position. The frame 44 retains the box 12 in a cubic shape when the frame 44 is in the deployed position. The box 12 is collapsed when the frame 44 is positioned in the folded position.

The frame 44 comprises a plurality of top members 46. Each of the top members 46 is positioned on the inside surface 24 of the box 12. Moreover, each of the top members 46 is aligned with the distal edge 28 of the box 12. Each of the top members 46 is coextensive with the perimeter wall of the box 12. Each of the top members 46 comprises a first half 48 that is hingedly coupled to a second half 50.

A plurality of first hinges 52 is provided. Each of the first hinges 52 is coupled to an associated one of the top members 46. Each of the first hinges 52 is positioned at an intersection of the first half 48 and the second half 50 of the associated top member. Each of the first hinges 52 selectively retains each of the top members 46 is the deployed position.

A plurality of bottom members 54 is provided. Each of the bottom members 54 is positioned on the inside surface 24 of the box 12. Moreover, each of the bottom members 54 is aligned with the bottom wall 20 of the box 12. Each of the bottom members 54 is coextensive with the peripheral wall of the box 12. Each of the bottom members 54 comprising a primary half 56 is hingedly coupled to the secondary half 58.

A plurality of second hinges 60 is provided. Each of the second hinges 60 is coupled to an associated one of the bottom members 54. Each of the second hinges 60 is positioned at an intersection of the primary half 56 and the secondary half 58 of the associated top member. Each of the second hinges 60 selectively retains each of the top members 46 is the deployed position. Each of the first hinges 52 and the second hinges 60 may comprise locking hinges or the like.

A plurality of uprights 62 is provided. Each of the uprights 62 is hingedly coupled between the top members 46 and the bottom members 54. Moreover, each of the uprights 62 is aligned with an associated one of the four corners 41 of the box 12. A bag 66 is provided. The box 12 and the frame 44 are positioned within the bag 66 when the frame 44 is positioned in the folded position.

A coupler 68 is provided and the coupler 68 is coupled to the box 12. The coupler 68 is coextensive with the distal edge 28 of the box 12 and the perimeter edge 32 of the lid 30. The coupler 68 may be manipulated to retain the lid 30 in the closed position. The coupler 68 may be a zipper or the like. The coupler 68 may include a pair of grips 70. Each of the grips 70 may be locked together to inhibit an unauthorized user from accessing the box 12.

In use, the frame 44 is positioned in the box 12 and the frame 44 is positioned in the deployed position. The box 12 is positioned in the bed 14 of the vehicle. Each of the tabs 40 is tied to the bed 14 of the vehicle. Thus, the box 12 is retained in the vehicle.

The objects 18 are placed in the box 12 and the lid 30 is positioned in the closed position. Each of the flaps 34 is manipulated to engage the second fasteners 38 to close the box 12. Thus, the box 12 inhibits the objects 18 from become wet from precipitation. The box 12 is removed from the frame 44. The frame 44 is positioned in the folded position. The box 12 and the folded frame 44 are stored in the bag 66.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A collapsible container assembly being configured to be positioned in a bed of a vehicle, said assembly comprising:
   a box being configured to be positioned in a bed of a vehicle thereby facilitating said box to store objects;
   a plurality of tabs, each of said tabs being coupled to said box wherein each of said tabs is configured to be tied to the vehicle thereby facilitating said box to be retained in the bed of the vehicle;
   a frame being positioned within said box, said frame being foldable such that said frame is selectively positioned between a deployed position and a folded position, said frame retaining said box in a cubic shape when said frame is in said deployed position, said box being collapsed when said frame is positioned in said folded position; and
   wherein said box is comprised of a fluid impermeable material wherein said box is configured to keep the objects dry, said box having a bottom wall and a perimeter wall, said perimeter wall having an inside surface, an outer surface and a distal edge with respect to said bottom wall, said box including a lid being selectively positioned on said distal edge to close said box, said lid having a perimeter edge, said lid including a plurality of flaps, said flaps being coextensive with said perimeter edge.

2. The assembly according to claim 1, further comprising a plurality of first fasteners, each of said first fasteners being coupled to an associated one of said flaps.

3. The assembly according to claim 2, further comprising a plurality of second fasteners, each of said second fasteners being coupled to said outer surface of said box, said second fasteners being spaced apart from each other and being distributed around said perimeter wall, each of said first fasteners being complementary with respect to said second fasteners such that said lid is retained in a closed position.

4. The assembly according to claim 1, wherein each of said tabs is spaced apart from each other and being aligned with an associated one of four corners of said box, each of said tabs being aligned with said bottom wall.

5. The assembly according to claim 1, wherein said frame comprises a plurality of top members, each of said top members being coupled to said inside surface of said box, each of said top members being aligned with said distal edge of said box, each of said top members being coextensive with said perimeter wall of said box, each of said top members comprising a first half being hingedly coupled to said second half.

6. The assembly according to claim 5, further comprising a plurality of first hinges, each of said first hinges being coupled to an associated one of said top members, each of said first hinges being positioned at an intersection of said first half and said second half of said associated top member, each of said first hinges selectively retaining each of said top members is said deployed position.

7. The assembly according to claim 1, further comprising a plurality of bottom members, each of said bottom members being coupled to said inside surface of said box, each of said bottom members being aligned with said bottom wall of said box, each of said bottom members being coextensive with said perimeter wall of said box, each of said bottom members comprising a primary half being hingedly coupled to said secondary half.

8. The assembly according to claim 7, further comprising a plurality of second hinges, each of said second hinges being coupled to an associated one of said bottom members, each of said second hinges being positioned at an intersection of said primary half and said secondary half of said associated top member, each of said second hinges selectively retaining each of said top members is said deployed position.

9. The assembly according to claim 7, further comprising:
   a plurality of top members; and
   a plurality of uprights, each of said uprights being hingedly coupled between said top members and said bottom members, each of said uprights being aligned with an associated one of said four corners of said box.

10. A collapsible container assembly being configured to be positioned in a bed of a vehicle, said assembly comprising:
   a box being configured to be positioned in a bed of a vehicle thereby facilitating said box to store objects, said box being comprised of a fluid impermeable material wherein said box is configured to keep the objects dry, said box having a bottom wall and a perimeter wall, said perimeter wall having an inside surface, an outer surface and a distal edge with respect to said bottom wall, said box including a lid being selectively positioned on said distal edge to close said box, said lid having a perimeter edge, said lid including a plurality of flaps, said flaps being coextensive with said perimeter edge;
   a plurality of first fasteners, each of said first fasteners being coupled to an associated one of said flaps;
   a plurality of second fasteners, each of said second fasteners being coupled to said outer surface of said box, said second fasteners being spaced apart from each other and being distributed around said perimeter wall, each of said first fasteners being complementary with respect to said second fasteners such that said lid is retained in a closed position;
   a plurality of tabs, each of said tabs being coupled to said box wherein each of said tabs is configured to be tied to the vehicle thereby facilitating said box to be retained in the bed of the vehicle, each of said tabs being spaced apart from each other and being aligned with an associated one of four corners of said box, each of said tabs being aligned with said bottom wall; and
   a frame being positioned within said box, said frame being foldable such that said frame is selectively positioned between a deployed position and a folded position, said frame retaining said box in a cubic shape when said frame is in said deployed position, said box being collapsed when said frame is positioned in said folded position, said frame comprising:
      a plurality of top members, each of said top members being coupled to said inside surface of said box, each of said top members being aligned with said distal edge of said box, each of said top members being coextensive with said perimeter wall of said box, each of said top members comprising a first half being hingedly coupled to said second half,
      a plurality of first hinges, each of said first hinges being coupled to an associated one of said top members, each of said first hinges being positioned at an intersection of said first half and said second half of said associated top member, each of said first hinges selectively retaining each of said top members is said deployed position,
      a plurality of bottom members, each of said bottom members being coupled to said inside surface of said box, each of said bottom members being aligned with said bottom wall of said box, each of said bottom members being coextensive with said perimeter wall of said box, each of said bottom members comprising a primary half being hingedly coupled to said secondary half,
      a plurality of second hinges, each of said second hinges being coupled to an associated one of said bottom members, each of said second hinges being positioned at an intersection of said primary half and said secondary half of said associated top member, each of said second hinges selectively retaining each of said top members is said deployed position, and
      a plurality of uprights, each of said uprights being hingedly coupled between said top members and said bottom members, each of said uprights being aligned with an associated one of said four corners of said box.

* * * * *